ured laser beam having a wave length above 5 microns. The focal point of the laser beam is positioned at a location spaced from one of the surfaces of the glass sheet to form an optimum laser beam spot size on a surface of the glass sheet. The beam spot size is such that at normal glass cutting speeds glass is vaporized faster than the feeding rate of glass into the space vacated by glass vaporization. The laser beam is moved over the glass to be cut at a rate not exceeding a rate calculated by a special formula.

United States Patent
Chui

[11] 3,885,943
[45] May 27, 1975

[54] METHOD OF CUTTING GLASS WITH A LASER

[75] Inventor: Granger K. Chui, Dearborn Heights, Mich.

[73] Assignee: Ford Motor Company, Dearborn, Mich.

[22] Filed: July 1, 1974

[21] Appl. No.: 484,903

[52] U.S. Cl. .......... 65/97; 65/87; 65/112; 225/4
[51] Int. Cl. .......... C03b 21/02
[58] Field of Search .......... 65/87, 97, 112, 105; 225/5, 4

[56] References Cited
UNITED STATES PATENTS

| | | | |
|---|---|---|---|
| 3,453,097 | 7/1969 | Häfner | 65/112 |
| 3,589,883 | 6/1971 | Dear | 65/97 |
| 3,601,576 | 8/1971 | Schlafli | 219/121 L |
| 3,754,884 | 8/1973 | McDavid et al. | 65/97 |

Primary Examiner—Arthur D. Kellogg
Attorney, Agent, or Firm—William E. Johnson; Keith L. Zerschling

[57] ABSTRACT

A method of cutting glass by use of focused laser beam is disclosed. A glass sheet is heated to a temperature in the range from about 1,000°F to about 1,250°F. A threshold power level is developed in a focused laser beam having a wave length above 5 microns. The focal point of the laser beam is positioned at a location spaced from one of the surfaces of the glass sheet to form an optimum laser beam spot size on a surface of the glass sheet. The beam spot size is such that at normal glass cutting speeds glass is vaporized faster than the feeding rate of glass into the space vacated by glass vaporization. The laser beam is moved over the glass to be cut at a rate not exceeding a rate calculated by a special formula.

5 Claims, 2 Drawing Figures

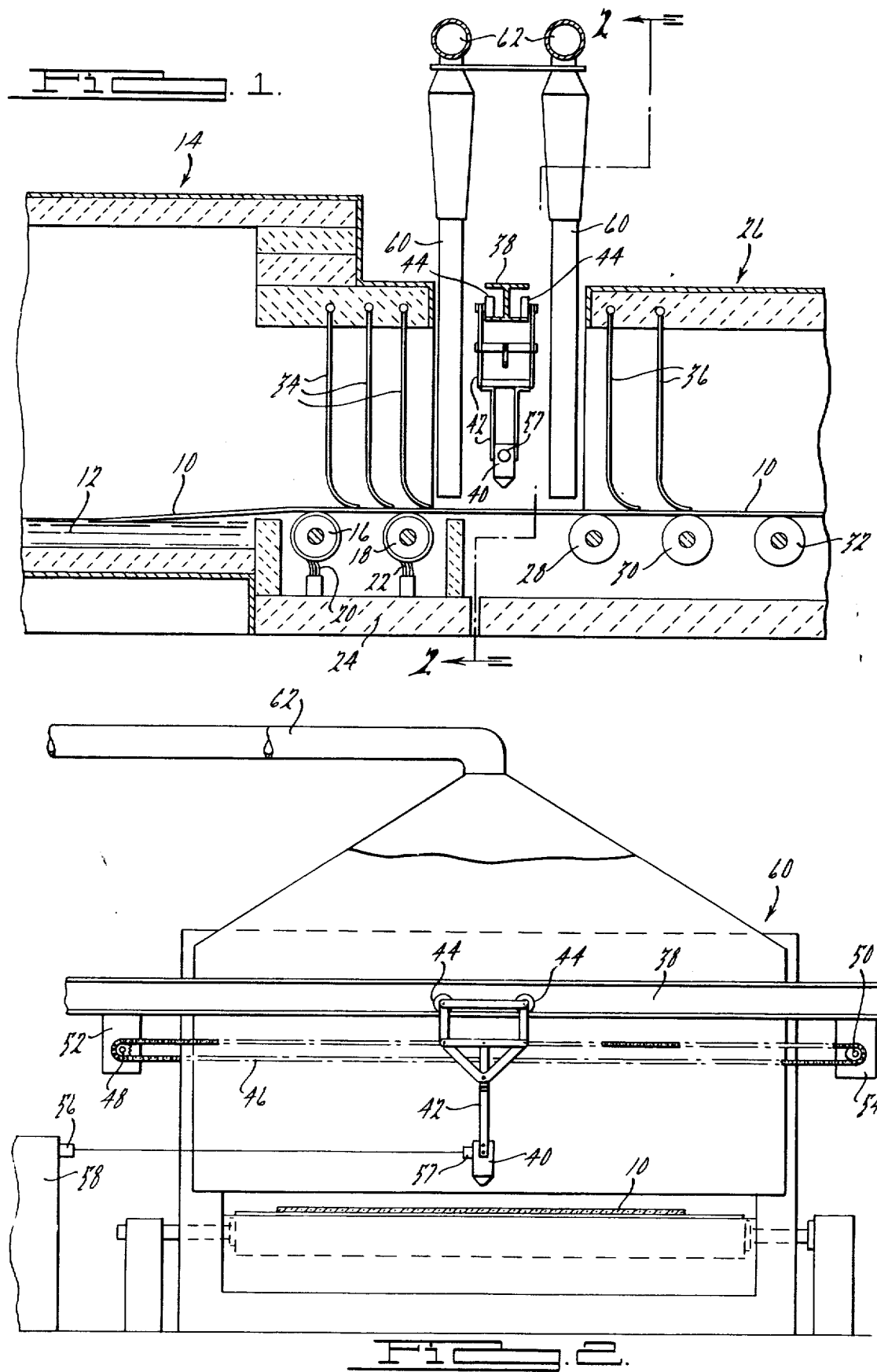

— 3,885,943 —

METHOD OF CUTTING GLASS WITH A LASER

BACKGROUND OF THE INVENTION

In recent years, the processing of material by lasers has gradually advanced from laboratory studies to production use. Today, lasers are used as production tools in many fields of work, such as the trimming of electronic components and the cutting of fabrics for garments. For some other materials, most importantly metals, development work is being carried out by various organizations; and such rapid progress has been made that the adaptation of lasers for commercial cutting, welding and heat treatment of metals appears to be imminent.

In the glass industry, however, the use of lasers for processing has received little attention. The literature shows that only a few articles exist on the use of lasers to cut glass. R. N. Lumley in "Control Separation of Brittle Materials Using a Laser," Ceramic Bulletin, Vol. 48, No. 9, 1969, discusses cutting 0.039 inch microscope slides with a 30 watt laser at 60 inches per minute. U.S. Pat. No. 3,543,977 indicates success in cutting one quarter inch glass at 100 inches per minute with a 100 watt laser. U.S. Pat. No. 3,453,097 proposes several methods of cutting glass including preheating the glass specimen to save laser energy. This patent however contains no specific data to support the allegations contained therein. Besides the above references, little published material appears pertinent.

The lack of success in applying laser energy to glass cutting may be due to the glass' intrinsic stress and fracture characteristics when it is subjected to some intense concentrated radiation. For the same reason and to a larger extent, when a piece of cold glass is exposed to a powerful laser beam, the severe thermal stress that is generated can crack the glass piece immediately. Thus, to cut cold glass successfully depends on the control of the fracture so that a crack propagates only along the laser path.

The authors mentioned above apparently succeeded in controlling the crack propagation in their investigations. However, efforts to repeat their experiments in the laboratory were not quite successful. With the methods suggested by Lumley and the first mentioned U.S. patent, the best repeatable results obtained for cutting glass by fractures were 90 in./min. at 75 watts for 0.039 inch microscope slides and 60 in./min. at 200 watts for 0.125 inch glass. The lengths of most cuts were under 5 inches. Longer cuts were less successful. Furthermore, attempts to increase the speed with higher power only resulted in losing control of crack propagation. Thus, it is believed that the method of controlling fracture only works under certain well defined laboratory conditions, and there are limits to the applicable power and the controllable cutting speed.

The difficulties caused by the fracture characteristics of glass directs one to the study of using laser power to cut glass at a state where cracks cannot be sustained. In this case the temperature of the glass should be maintained in its annealing range (typically from 950°F to 1,200°F). In this range, cutting can be accomplished either by vaporizing enough glass volume to allow separation or by melting glass at the laser path and then following by the removal of molten glass by another means, such as gas jets. The latter approach was also proposed by the second patent cited above, although the patentee's motive was not to avoid the fracture but rather to save laser power by preheating the glass. It was found, however, that the jet assist method created some other problems. The molten glass particles blown away by the gas jet deposited and stuck on the hot glass surface, ruining its optical qualities. In addition, the edges of the cut produced were very rough.

Accordingly, it is a principal object of this invention to provide a method for cutting hot glass by the use of laser power.

SUMMARY OF THE INVENTION

This invention relates to a method of cutting glass and, more particularly, to a method of cutting glass by use of a focused laser beam.

The method of this invention includes the following steps. A glass sheet having an upper surface and a lower surface is heated to a temperature in the range from about 1,000°F to about 1,250°F. At least a threshold power level is developed in a focused laser beam, the laser beam having a wave length above 5 microns. The focal point of the focused laser beam is positioned at a location spaced from one surface of the glass sheet such that an optimum laser beam spot size is formed on a surface of the glass sheet. The beam spot size is such that at normal glass cutting speeds vaporization of the glass by the laser beam is at a rate faster than the feeding rate of adjacent glass into the space vacated by glass vaporization. The glass to be cut and the laser beam are moved relative to one another at a transverse velocity not exceeding that calculated by the formula $V = P/4.88h^2$, where V is transverse velocity in inches per minute, P is laser power in kilowatts, and h is glass thickness in inches.

The method of this invention has particular utility when used in a position between a float glass manufacturing chamber and an annealing lehr. At such a position, the glass has a temperature which makes it suitable for cutting.

BRIEF DESCRIPTION OF THE DRAWINGS

FIG. 1 is a fragmentary, longitudinal sectional view of a float glass forming apparatus modified by the addition of the glass cutting apparatus which performs the method of this invention.

FIG. 2 is a fragmentary, transverse sectional view taken across the glass cutting apparatus of FIG. 1 along line 2—2.

DESCRIPTION OF THE PREFERRED EMBODIMENT

Construction

Referring to the drawings, a continuous glass ribbon 10 is lifted from a molten tin bath 12 contained within a float glass chamber, generally designated by the numeral 14. The glass ribbon 10 is lifted from the bath 12 at the exit end of the float bath chamber 14 on rolls 16 and 18, which are suitably journaled and driven by conventional roll driving structure connected to a driving motor (not shown). Carbon blocks 20 and 22 are spring pressed against bottom of the rolls to remove any materials which may become deposited thereon. The carbon blocks are supported in a chamber extension 24 into which the material removed from the rolls falls and can be removed.

The glass ribbon 10 is conveyed into an annealing lehr 26 having a plurality of lehr rolls 28, 30 and 32 therein. A conventional driving structure is provided for rotating the rolls in unison. Each lehr roll exerts a tractive force on the glass ribbon of sufficient magnitude to convey the glass through the lehr where its temperature is controlled to release permanent stress and strain in the glass.

To retain an atmosphere within the interior of the float bath chamber 14, the exit end of the chamber is provided with a series of drapes 34 which trail on the glass ribbon 10. These drapes are generally made of a flexible asbestos material which does not mar the glass and which will withstand the temperature of the environment, which is in the range of approximately 1,000°F to 1,250°F at or adjacent the end of the chamber. Conventional drapes 36 of similar material are provided at the entrance end of the lehr 26.

A horizontally extending channel beam 38 extends over and beyond the side of the path taken by the glass ribbon 10 between the float bath chamber 14 and the annealing lehr 26. This beam is supported on vertical legs (not shown) disposed beyond the lateral side edges of the chamber and lehr. A laser focusing structure 40 is attached by support structure 42 to a plurality of wheels 44. The wheels are received on lower portions of the channel beam 38 for movement thereacross. A chain drive 46 is provided which rides over a pair of sprockets 48 and 50 respectively mounted on supporting structure 52 and 54 secured at opposite ends of the beam 38. The sprockets 48 and 50 are driven by motors (not shown) in order to reciprocate the laser focusing structure 40 across the width of the glass ribbon passing below. While the drawing shows the beam 38 being mounted in a position perpendicular to the direction of passage of the ribbon below, it is readily apparent that the beam may be mounted at an angular attitude so that a straight cut is made by the laser across a glass ribbon moving at a predetermined speed therebelow. At relatively slow rates of ribbon movement, the angular attitude of the beam with respect to the path of travel of the glass is slightly off of perpendicular, with the angle increasing as the speed of glass passing therebelow increases. Such orientation of the beam upon which is mounted a glass cutting device and a glass ribbon is well known to those skilled in the art.

A light guide 56 cooperates with a light guide 57 on the laser focusing structure 40 to connect the structure to a laser generating power source 58. In accordance with the teachings of this invention, the laser must have a wave length above 5 microns.

To the fore and aft of the area where the laser cuts the glass ribbon 10, there is disposed a vacuum hood 60. These hoods extend vertically upward to a pair of exhaust pipes 62. The hoods are spaced from one another a sufficient distance that the laser 40 may be reciprocated therebetween. The structure for supporting the hoods and the devices for drawing the vacuum are not shown as they are standard in construction.

Operation

In accordance with the teachings of a preferred embodiment of this invention, the laser 40 is a 15KW $CO_2$ laser. The laser is operated by the power source 58 through the guides 56 and 57. The glass ribbon 10 is formed in the float bath chamber 14 in a known manner. When the glass ribbon exits the chamber, it has a temperature in the range from 1,000°F to 1,250°F, and more generally about 1,100°F. The glass ribbon passes into a zone of cutting defined between the pair of vacuum hoods 60—60. In this zone of cutting, the laser having a wave length above 5 microns is positioned by the laser focusing structure so that the focal point of the focused beam is at a location spaced from one of the surfaces of the glass sheet. In this case, the laser is focused at a point below the glass sheet so that an optimum laser beam spot size is formed on the upper surface of the glass sheet. The beam spot size is such that at normal glass cutting speeds vaporization by the laser beam is at a rate faster than the feeding rate of adjacent glass into the space vacated by glass vaporization. The term vaporization refers to a decomposition of glass rather than the usual meaning of a phase change from liquid or solid to gas. The decomposition occassioned by use of a laser to cut glass produces a cloud of very fine white powder and a pungent acidic smell. The white powder consist mainly of silica so it appears that the laser beam decomposes the soda lime glass to silica and compounds of sodium and calcium, which decomposition is covered by the term vaporization herein.

Simultaneously with the vaporization, the glass volume in the neighborhood of the laser path is heated to very high temperatures by a combination of heat transfer within the glass and the absorption of energy at the fringe area of the laser beam where the power is too diffused to induce vaporization. The high temperature glass is very fluid, and flows readily. A driving force is provided by surface tension, which tries to minimize the surface area continuously as glass volume is being vaporized. The result of the surface-tension-induced flow is that more glass is fed to the vaporization area. A cut can be obtained only if vaporization is faster than the feeding of adjacent glass. The vacuum hood 60 through their associated exhaust pipe 62 aid in withdrawing the vaporized material from the zone of glass cutting.

If the beam spot size formed on the glass surface for a particular laser is too small, the laser will cut the glass, but the liquid glass left therebehind will reclose the cut. In order to obtain a clean cut which does not reseal itself, a velocity of traverse across the glass must be correlated with the power input of the laser and the thickness of the glass to be cut. It has been determined that the laser can be moved relative to the glass ribbon no faster than in accordance with the following equation if one desires to maintain the cut open and not permit it to reseal after the laser has gone therepast. The laser and the glass must be moved at a transverse velocity not exceeding that calculated by the formula $V=P/4.88h^2$, where $V$ is the transverse velocity in inches per minute, $P$ is the laser power in kilowatts, and $h$ is glass thickness in inches. If the transverse velocity calculated by this formula is not exceeded, the laser will cut the glass and the glass will not reseal after its cutting.

Thus it is seen that two critical factors exist for the cutting of glass by a laser. The first condition is that the beam spot size of the laser on the glass surface to be cut is sufficiently wide that than when a glass ribbon is cut, the liquid glass on both sides of the cut will have sufficient room to act under the forces of surface tension and to be pulled into smooth rounded surfaces which do not contact one another. If the beam spot size is too small or too big, sufficient room is not given for the forces of surface tension to act in forming the new edges of the glass, or, on the other hand, the power is dissipated over such a substantial volume of material that no cutting through of the glass is achieved. The second important factor is that the transverse velocity of the focused laser beam shall not be greater than that determined by the formula above given. If the speed exceeds that calculated thereby, the focused laser beam does not have the proper opportunity to vaporize sufficient material to allow the forces of surface tension in the glass to form the two edges produced by the cutting operation into smooth curved surfaces.

In accordance with the detailed teachings of this preferred embodiment, the glass ribbon manufactured in the flow chamber 14 is cut by moving the laser 40 thereacross. The vaporized materials are removed, as aforesaid, through the vacuum hoods 60. The glass ribbon, as cut, is then annealed in the annealing lehr 26 in order to achieve the proper stress orientations therein.

There has been disclosed herein a method of cutting glass by a focused laser beam. Modifications of this invention will be apparent to those skilled in the art in view of the teachings of this application. It is intended that the scope of the claims herein appended include all modifications which fall within the true spirit and scope of this invention.

I claim:

1. A method of cutting glass by use of a focused laser beam which comprises the steps of:

heating a glass sheet having an upper surface and a lower surface to a temperature in the range of from about 1,000°F to about 1,250°F;

developing at least a threshold power level in the focused beam, the laser beam having a wave length above 5 microns;

positioning the focal point of the focused laser beam at a location spaced from one of the surfaces of the glass sheet such that an optimum laser beam spot size is formed on the upper surface of the glass sheet, the beam spot size being such that at normal glass cutting speeds glass vaporization by the laser beam is at a rate faster than the feeding rate of adjacent glass into the space vacated by glass vaporization;

and moving the glass to be cut and annealing laser beam relative to one another at a traverse velocity not exceeding that calculated by the formula $V = P/4.88h^2$, where $V$ is transverse velocity in inches per minute, $P$ is laser power in kilowatts, and $h$ is glass thickness in inches.

2. The method of cutting glass as defined in claim 1 wherein the glass sheet is heated to a temperature of about 1,100°F.

3. The method of cutting glass as defined in claim 1 wherein: the laser beam employed is developed from a $CO_2$ laser.

4. The method of cutting glass as defined in claim 3 wherein: the $CO_2$ laser beam has a power of 15KW.

5. The method of cutting glass as defined in claim 1 wherein: the cutting process takes place between a float glass chamber and a glass annealing lehr.

* * * * *